US012802008B2

(12) United States Patent
Kumar et al.

(10) Patent No.: US 12,802,008 B2
(45) Date of Patent: Nov. 17, 2026

(54) METHOD FOR USE IN PLANNING OF TASKS TO BE PERFORMED BY A VEHICLE

(71) Applicant: VOLVO TRUCK CORPORATION, Gothenburg (SE)

(72) Inventors: Manoj Kumar, Bangalore Karnataka (IN); Mahantesh Kumbar, Sadalga Karnataka (IN); Balagopal Prakash Kumar, Kottayam Kerala (IN); Tony Shaji Manakkattu, Bangalore Karnataka (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 318 days.

(21) Appl. No.: 18/462,970

(22) Filed: Sep. 7, 2023

(65) Prior Publication Data

US 2024/0086811 A1 Mar. 14, 2024

(30) Foreign Application Priority Data

Sep. 12, 2022 (EP) .................................... 22195161

(51) Int. Cl.

*G06Q 10/06* (2023.01)
*G06Q 10/0631* (2023.01)
*G06Q 50/08* (2012.01)

(52) U.S. Cl.

CPC . *G06Q 10/06316* (2013.01); *G06Q 10/06313* (2013.01); *G06Q 50/08* (2013.01)

(58) Field of Classification Search

CPC ...................................................... G06Q 10/06
See application file for complete search history.

(56) References Cited

U.S. PATENT DOCUMENTS 11,270,396 B1 * 3/2022 Sullivan ............... G06Q 50/163
2015/0273693 A1 * 10/2015 Cohen .................... B25J 13/006 901/47

(Continued)

FOREIGN PATENT DOCUMENTS

GB 2572962 A * 10/2019 ......... G01C 21/3476

OTHER PUBLICATIONS

Extended European Search Report in corresponding European Application No. 22195161.9 dated Feb. 13, 2023 (8 pages).

(Continued)

*Primary Examiner* — Kurtis Gills
(74) *Attorney, Agent, or Firm* — Jeffri A. Kaminski; Venable LLP

(57) ABSTRACT

A method for use in planning of tasks to be performed by one or more vehicles within an evolving site includes obtaining a request relating to at least one task to be performed by the one or more vehicles, wherein the at least one task involves at least travelling from a starting location to a target location, obtaining geographic location data comprising at least the starting location and the target location, obtaining site data from at least a dynamic BIM of the site, planning of the at least one task by using at least the request, the geographic location data, and the site data as input data to a prediction model, wherein the planning of the at least one task comprises at least planning of a travel path within the site, providing information relating to the planned at least one task to be presented via at least one user interface, and generating site update data for updating the dynamic BIM based on user input.

14 Claims, 3 Drawing Sheets

(56) References Cited

U.S. PATENT DOCUMENTS

| | | | | |
|---|---|---|---|---|
| 2016/0011842 | A1* | 1/2016 | Hsieh | G06F 3/147<br>345/173 |
| 2017/0066135 | A1* | 3/2017 | Cohen | H04L 67/12 |
| 2019/0316924 | A1* | 10/2019 | Morgan-Brown | G01C 21/3697 |
| 2022/0187841 | A1* | 6/2022 | Ebrahimi Afrouzi | G05D 1/246 |
| 2022/0334580 | A1* | 10/2022 | Dean | A61G 5/04 |
| 2022/0383231 | A1* | 12/2022 | Saha | G06Q 10/063114 |

OTHER PUBLICATIONS

Pradhananga, Nipesh et al: "Automatic spatio-temporal analysis of construction site equipment operations using GPS data", Automation iN Construction, vol. 29, Jan. 1, 2013, pp. 107-122, XP093019997, Amsterdam, NL; ISSN: 0926-5805, DOI: 10.1016/j.autcon.2012.09.004.

Karmakar, Ankan, Singh, A. R., & Delhi, V. S. K. (2022). "Automated route planning for construction site utilizing Building Information Modeling". Journal of Information Technology in Construction (ITcon), 27(40), pp. 827-844, Aug. 26, 2022, XP093019702, DOI: 10.36680/j.itcon.2022.040.

* cited by examiner

METHOD FOR USE IN PLANNING OF TASKS TO BE PERFORMED BY A VEHICLE

TECHNICAL FIELD

The invention relates to a computer-implemented method for use in planning of tasks to be performed by one or more vehicles within an evolving site, such as a construction site. The invention further relates to a computer program, a computer readable medium, and a control system for planning of tasks to be performed by one or more vehicles within an evolving site.

The invention may be applied by any unit suitable for planning of tasks, for example in a control system comprising one or more electronic control units.

BACKGROUND

A Building Information Model (BIM) is commonly used for creating and managing information for built assets and evolving sites in the architecture, engineering, and construction (AEC) industries. Based on an intelligent model and enabled by a cloud platform, the BIM integrates structured, multi-disciplinary data to produce a digital representation of an asset across its lifecycle, from planning and design to construction and operations. The digital representation may be managed in an open cloud platform for real-time collaboration, bringing advantages such as better visibility, sustainability, and cost-savings on AEC projects.

Tasks to be performed by heavy vehicles within an evolving site such as a construction site include, e.g., delivery and pickup of goods, loading and unloading of goods, etc. A challenge in the planning of such tasks is the changing infrastructure and appearance of the site. Hence, reliable data regarding the present appearance of the site are required.

Methods for keeping the BIM up to date during the construction stage include collecting images of the site, such as images acquired by cameras onboard of dedicated host vehicles. Such dedicated host vehicles may for example be unmanned aerial or ground vehicles. However, the conditions at an evolving construction site are often dirty and a method that rely on acquiring images is therefore rather demanding in terms of keeping the cameras clean and functional, entailing high maintenance costs. Furthermore, the use of images requires image processing, which is associated with a relatively high computational cost.

SUMMARY

An object of the invention is to provide a method for the use in planning of tasks to be performed by vehicle(s) within an evolving site, which method is in at least some aspect improved in comparison with known such methods.

According to a first aspect of the invention, the object is achieved a computer-implemented method for use in planning of tasks to be performed by one or more vehicles within an evolving site, such as a construction site, is provided. The method comprises:

- obtaining a request relating to at least one task to be performed by the one or more vehicles, wherein the at least one task involves at least travelling from a starting location to a target location within the evolving site,
- obtaining geographic location data, wherein the geographic location data comprises at least the starting location and the target location of the one or more vehicles,
- obtaining site data from at least a dynamic building information model, BIM, of the evolving site,
- planning of the at least one task by using at least the request, the geographic location data, and the site data as input data to a prediction model, wherein the planning of the at least one task comprises at least planning of a travel path within the evolving site from the starting location to the target location,
- providing information relating to the planned at least one task to be presented via at least one user interface, and
- generating site update data for updating the dynamic building information model based on user input received via the at least one user interface in connection with performing and/or completing the planned at least one task.

By relying on user input received via the at least one user interface for generating the site update data to be used for updating the BIM, no image processing is necessary for generating the data. This contrasts with methods relying on images acquired by cameras or similar for updating BIMs. In comparison with such methods, the present method enables a faster and less computationally demanding generation of site update data for updating the BIM, which is suitable for evolving sites such as construction sites. The present method also enables reduced maintenance costs, since it does not require clean and functional cameras for keeping the BIM updated as the site evolves.

The presentation of information via the user interface(s) allows a user to initiate the performance of the at least one task. The provided information that is to be presented includes output from the prediction model, such as a planned travel path. The user interface may, by way of example, be a terminal device, e.g., a smartphone, a laptop, a tablet, or similar. User input may be provided by means of, e.g., a touch board, a microphone, a keyboard, a touch screen, a microphone, or similar. The user input used for generating site update data may be, for example, user commands, selections from multiple-choice lists, entries of numbers and/or text strings, voice input etc. The user may for example provide input as to the names of locations mapped with Global Navigation Satellite System (GNSS), e.g. GPS, coordinates in the evolving site.

The present disclosure relates to the planning of tasks involving travelling from a starting location to a target location within the evolving site, although the tasks as such may also involve travelling outside of the site. If the vehicle which is to perform the task is currently located outside of the site, the starting location for navigation within the site may be set to an entry point of the site. Similarly, if the task involves travelling to a location outside of the site, the target location for navigation within the site may be set to an exit point of the site. The planning of the task may include a time planning, i.e., determining a suitable time for starting of the task and/or estimating a time needed for completing the task. Such a time planning may at least in part be based on a predicted evolvement of the site.

Optionally, the at least one task comprises charging of an electric energy storage system, ESS, of the one or more vehicles, wherein the method further comprises:

- obtaining ESS data comprising information relating to a state-of-charge, SoC, of the ESS,
- obtaining charging station data comprising information relating to a location and a status of at least one charging station within the evolving site, wherein the input data used for planning of the at least one task comprises the obtained ESS data and charging station data.

The target location may herein be set to the charging station, which may be a stationary or a mobile charging station. The task to be performed may hence be charging of the vehicle. This allows for efficient use of available charging stations and vehicles within the site. The charging task may preferably be combined with another task, such as loading/unloading of goods, so that two or more tasks are planned to be carried out simultaneously. This allows efficient time management.

Optionally, the at least one task comprises loading and/or unloading of goods. This may be loading and/or unloading to/from the one or more vehicles in connection with delivery and/or pickup of goods at the site. The target position may be set to a location at which loading or unloading of the goods is to be carried out.

Optionally, the method further comprises:

obtaining vehicle data relating to a vehicle weight and/or a vehicle payload capacity of the one or more vehicles, wherein the vehicle data is used as input data for the planning of the loading and/or unloading of goods. In this way, the most suitable vehicle(s) for performing the at least one task may be identified, and/or a number of vehicles necessary for performing the task(s) may be determined, and/or a time consumption for completing the task may be predicted based on the vehicle weight and/or vehicle payload capacity.

Optionally, the planning of the loading and/or unloading of goods comprises determining a loading and/or unloading location as the target location based on the site data. The target location within the site may hereby be determined in cases when the user is not aware of the actual loading and/or unloading location.

Optionally, the site data obtained from the BIM comprises data relating to one or more of the following:

- boundaries of the evolving site,
- coordinates and dimensions of features/structures within the evolving site, such as structures, storage spaces, unloading and loading locations, charging stations, and machinery,
- material stocks within the evolving site, such as locations, types, weights and/or dimensions of the material stocks,
- materials used for construction within the evolving site,
- available storage space within the evolving site,
- status of equipment located within the evolving site, such as status of machinery,
- manpower within the evolving site,
- a time log of the evolving site.

The site update data used for updating the BIM generated based on user input may accordingly include data relating to any one or more of the above. For example, as a task of unloading goods in completed, user input from a vehicle operator/driver may relate to the amount and type of goods that was unloaded, and/or to an estimation of remaining available storage space at the unloading location.

Optionally, the method further comprises:

based on the obtained request, selecting a subset of the site data to be used as input data for the planning of the at least one task, preferably wherein selecting the subset of the site data is performed based on a previously established correlation between the at least one task and the selected subset of the site data.

Hence, a selective parametric analysis, establishing a correlation between the most important inputs and outputs, is performed for ruling out site data that is not necessary for the planning of the task. This saves computational power and allows a faster processing of the request.

Optionally, obtaining the request relating to the at least one task comprises receiving a user request via the at least one user interface. The user request may, e.g., be a request for directions to the target location from a vehicle operator, and/or a request to find a target location for completing a specific task, such as for charging of the vehicle.

Optionally, the target location is set based on user input received via the at least one user interface. The user input may include the selection of a target location from a map, a list, or similar, such as by selecting the target location from a graphic representation of the site provided on a touch screen or similar. The target location may also be selected automatically based on a user input command or information from the user relating to the task to be performed.

Optionally, the planning of the at least one task comprises predicting an evolvement of the evolving site based on at least historical site data. The evolvement of the site herein refers to changes in dimensions and coordinates of structures and features, status of machinery, etc, which changes are expected to come about during a prediction time horizon. A Markov process can be used in the prediction.

Optionally, predicting the evolvement of the evolving site is further performed based on user input received via the at least one user interface. User input entered by, e.g., a vehicle operator, an inventory manager, or another user, is herein fed to the prediction model and used to predict the evolvement of the site during the prediction time horizon. This enables the taking of user input that has not yet been used for updating the BIM into account.

Optionally, generating site update data for updating the dynamic building information model is further performed based on geographic location data collected by the one or more vehicles during performance of the at least one task. The geographic location data may be data representing an actual path travelled by the vehicle and/or data representing the starting and/or the target location. For example, the geographic location data may be data revealing that the vehicle travelled a different route than was initially planned, and/or that the target location had moved. Such geographic location data may thus be valuable for keeping the BIM updated. In some cases, only geographic location data that differ from the planned travel path may be used in order to reduce data processing.

Optionally, the method further comprises obtaining information relating to a user category of a user, wherein the information relating to the planned at least one task is selectively provided for presentation via the at least one user interface, depending on the user category. I.e., depending on the user category, different users may be presented with different information. For example, a driver may be presented with a graphic representation of the planned travel path, a status of various equipment, etc., while an inventory manager may be presented with other information such as an amount and type of material or goods delivered or fetched by the vehicle(s), a number of days that the stock is to remain in the storage space, deviations from an existing plan for the storage space, etc.

Optionally, when the user is a vehicle operator, providing information relating to the planned at least one task comprises providing information that enables presentation of at least the planned travel path to the vehicle operator. The vehicle operator may for example be a driver of the vehicle.

According to a second aspect of the invention, a computer program comprising program code means for performing the steps of the method according to the first aspect when said program is run on a computer is provided.

According to a third aspect of the invention, a computer readable medium carrying a computer program comprising program code means for performing the steps of the method according to the first aspect when said program is run on a computer is provided.

According to a fourth aspect of the invention, a control system for planning of tasks to be performed by one or more vehicles within an evolving site, such as a construction site, is provided. The control system comprises one or more electronic control units configured to perform the method according to the first aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

The drawings are schematic and not drawn to scale.

DETAILED DESCRIPTION OF EXAMPLE EMBODIMENTS OF THE INVENTION

Figure 1:
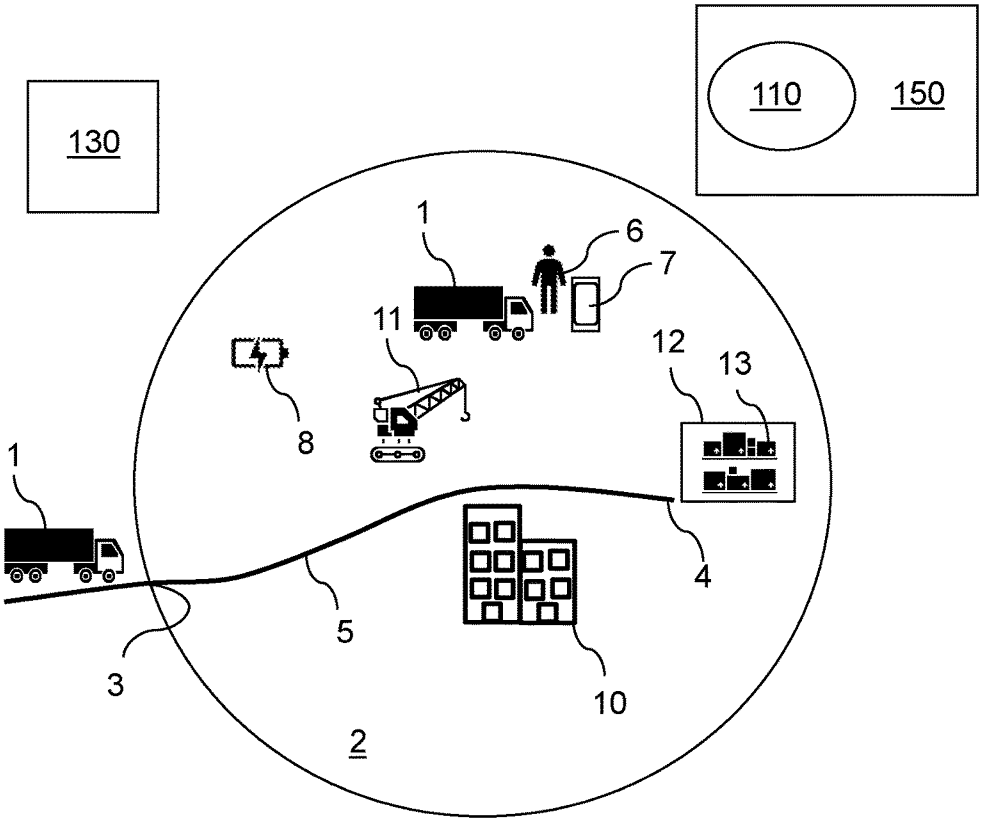
FIG. 1 schematically illustrates an evolving construction site.

The present invention relates to a computer-implemented method for use in planning of tasks to be performed by one or more vehicles 1 within an evolving site 2. Such an evolving site 2 in the form of a construction site is schematically illustrated in FIG. 1. The tasks may involve loading and/or unloading of goods 13 by the vehicle 1 at a goods storage location 12 within the site 2, wherein the vehicle 1 may, e.g., be a truck or another heavy-duty vehicle. The tasks may also involve charging of an electric energy storage system, ESS, of the vehicle 1 at an electric charging station 8 within the site 2. The site 2 may comprise both stationary and mobile charging stations 8.

The site comprises a structure 10, herein illustrated as a building under construction, and building equipment 11.

The evolving site 2 is modelled using a dynamic building information model 110, BIM, located on a server 150 or similar. The BIM 110 comprises site data, such as boundaries of the evolving site 2, coordinates and dimensions of structures 10 within the site 2, material stocks, available storage space at the storage locations 12, status of building equipment 11 located within the site 2, manpower, and a time log of the site 2 reflecting evolvement of the site data over a past time horizon. Various users, such as a user 6 in the form of a vehicle operator, a driver, an inventory manager, or similar, may be presented with data from the BIM 110 by means of a user interface 7 in the form of a terminal device, e.g., a smartphone, a laptop, a tablet, or similar. The user 6 may also use the user interface 7 for input of information which is subsequently for updating of the BIM 110.

Figure 2:
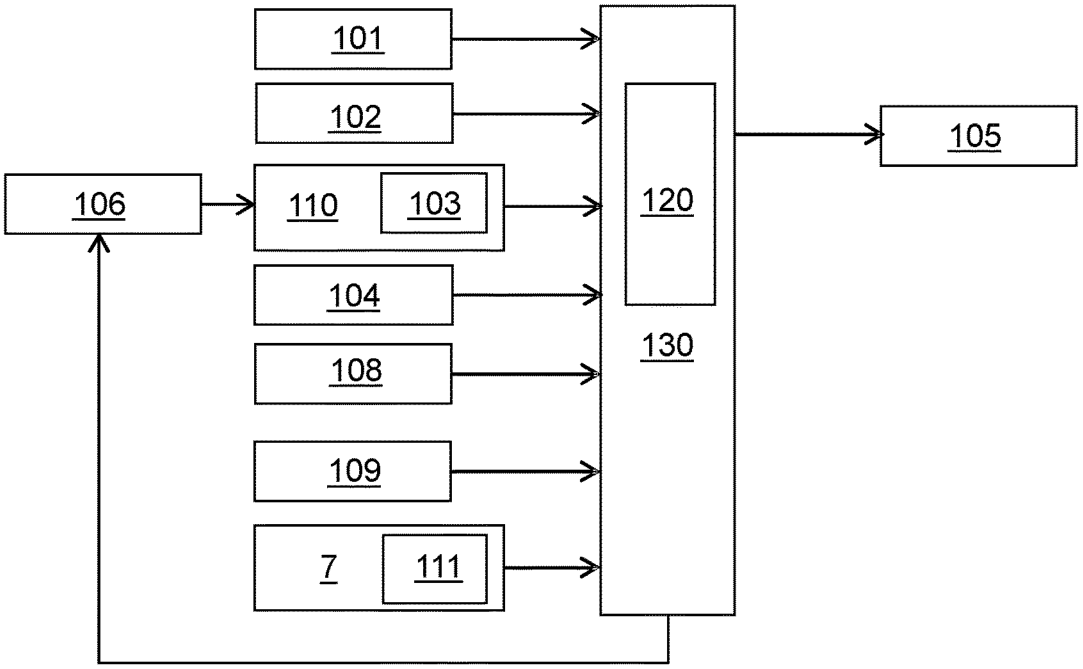
FIG. 2 illustrates data flows in a method according to an embodiment.

A method for use in planning of tasks to be performed by one or more vehicles 1 within the evolving site 2 is illustrated in the flow chart shown in FIG. 2. The method may be performed in a control system 130 comprising one or more electronic control units. The control system 130 is communicatively connected with the server 150 on which the BIM 110 is provided, and with various systems and units within the evolving site 2, such as at least with the user interfaces 7. The control system 130 may preferably also be communicatively connected with systems of the vehicles 1 and the charging stations 8.

Figure 3:
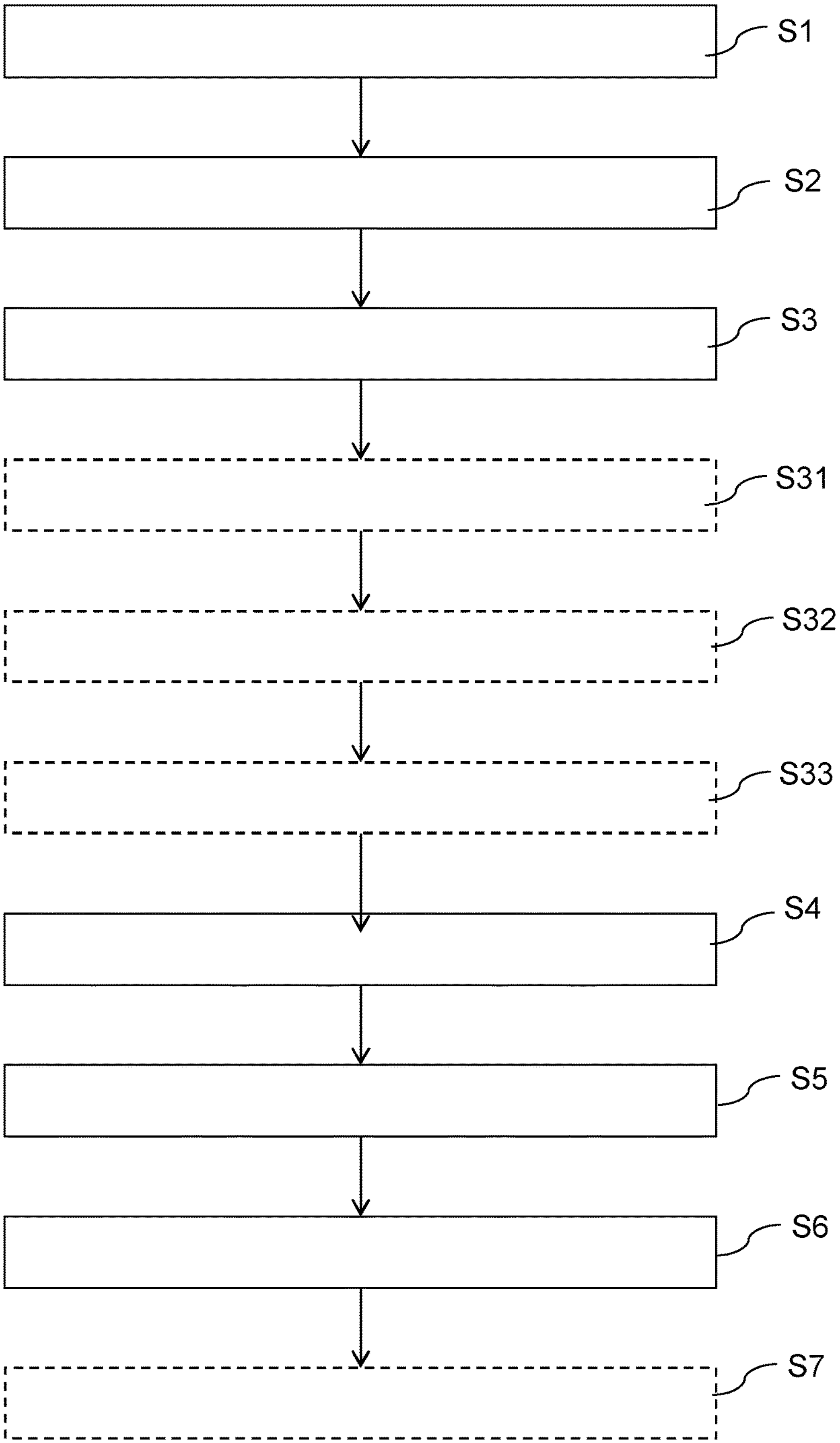
FIG. 3 is a flow chart illustrating a method according to an embodiment of the invention.

Dashed boxes in FIG. 3 indicates optional actions and the actions may be taken in any suitable order. Reference is also made to FIG. 2, illustrating a flow of data, information and requests when carrying out a method according to embodiments of the invention.

Action S1

In an action S1, the method comprises obtaining a request 101 relating to at least one task to be performed by the one or more vehicles 1, wherein the at least one task involves at least travelling from a starting location 3 to a target location 4 within the evolving site 2. In FIG. 1, the starting location 3 is an entry point to the site 2, such as a gateway, and the target location 4 is the goods storage location 12. The task to be performed may in this case hence be the loading and/or unloading of goods 13 at the goods storage location 12.

The action S1 may comprise receiving a user request from the user 6 via the at least one user interface 7.

Action S2

The method further comprises an action S2 of obtaining geographic location data 102, wherein the geographic location data comprises at least the starting location 3 and the target location 4 of the one or more vehicles 1. The geographic location data 102 may be obtained from a navigation system of the vehicle 1, for example location data relating to a current position of the vehicle 1. The geographic location data relating to the starting position 3 and the target position 4 may also be received from other sources, such as included in site data received from the dynamic BIM 110 of the evolving site 2, or received from other vehicles or users within the site 2. The starting location may coincide with the current position of the vehicle 1, but it may also be another location, such as an entry point of the site 2 which is closest to the vehicle, or which is easiest to reach from a current position of the vehicle 1 when located outside of the site 1.

Action S3

The method comprises an action S3 of obtaining site data 103 from at least the dynamic BIM 110 of the evolving site 2. Site data may also be obtained from other sources, such as from user input. For example, site data 103 may be obtained directly from a site manager updating the BIM 110 with the current progress that is happening in the evolving site 2 as will be further described in connection with action S6 below.

The site data 103 are data relating to the site 2, such as: boundaries of the evolving site 2; coordinates and dimensions of features/structures within the evolving site 2, such as structures, storage spaces, unloading and loading locations, charging stations 8, and machinery; material stocks within the evolving site 2, such as locations, types, weights and/or dimensions of the material stocks; materials used for construction within the evolving site 2; available storage space within the evolving site 2; status of equipment 11 located within the evolving site 2, such as status of machinery; manpower within the evolving site 2; a time log of the evolving site 2, etc.

Action S31

The method may further comprise an action S31 of obtaining vehicle data 109 relating to a vehicle weight and/or a vehicle payload capacity of the one or more vehicles 1. The vehicle payload capacity may be in terms of weight and/or volume that the vehicle 1 is able to transport. Also other vehicle data 109 may be obtained, such as remaining energy of the vehicle 1, remaining distance to empty, a maximum power expected to be required while goods are transported according to the geography and/or topography of the site 2, etc. The vehicle data 109 may be obtained from a user 6, such as via the user interface 7, or communicated from a vehicle system of the vehicle 1, for example based on information collected by one or more sensors onboard the vehicle 1.

Action S32

When the task involves charging of an electric energy storage system, ESS, of the vehicle 1, the method may further comprise an action of S32 of obtaining ESS data 104 comprising information relating to a state-of-charge of the ESS of the one or more vehicles 1. Such ESS data 104 may be provided by an ESS management unit (not shown) of the vehicle 1, either directly or via an intermediate communication system of the vehicle 1. The ESS data 104 may be included in the vehicle data 109 obtained in action S31.

Action S33

When the task involves charging of an electric energy storage system, ESS, of the vehicle 1, the method may further comprise an action S33 of obtaining charging station data 108 comprising information relating to a location and a status of at least one charging station 8 within the evolving site 2. Such charging station data 108 may in some cases be included within the site data 103 obtained from the BIM 110, but at least part of the charging station data 108 may be provided separately, such as by identifying, based on vehicle data from other vehicle(s) within the site 2, that another vehicle 1 is currently located at the charging station 8. Alternatively, information relating to a charging infrastructure may be excluded from the BIM 110 altogether, and hence be received from a different source such as a central server or a system of the charging station 8. The charging station 8 may be a mobile charging station or a stationary charging station. The site may comprise a combination of mobile and stationary charging stations 8. The planning of the charging task may include determining a suitable location of a mobile charging station 8 comprised in a first vehicle, for charging of a second vehicle using vehicle-to-vehicle charging technology. When the charging is combined with loading/unloading of goods, the planning may comprise identifying a suitable vehicle parking location and/or orientation at a storage location 12, at which space is available for the first vehicle containing the mobile charging station 8 as well as for the second vehicle 1 which is to collect or leave goods.

Planning of charging may also include planning of the ESSs of mobile charging stations at stationary charging stations, using grid-to-vehicle charging technologies.

The status of the charging station 8 may, e.g., be indicated as "functional", "occupied", "free", etc. Furthermore, the charging station data 108 may comprise information relating to a type of charging interface, an expected charging time, etc.

Action S4

The method further comprises an action S4 of planning the at least one task by using at least the request 101, the geographic location data 102, and the site data 103 as input data to a prediction model 120. The prediction model 120 is used for the planning of the at least one task. The planning comprises at least planning of a travel path 5 within the evolving site 2 from the starting location 3 to the target location 4.

The planned at least one task may, e.g., involve loading and/or unloading of goods 13. The vehicle data 109 obtained in action S31, in particular vehicle data 109 relating to the vehicle weight and/or the vehicle payload capacity, may in this case be used as input data for the planning of the loading and/or unloading of goods 13. Site data 103 from the BIM include, e.g., coordinates of storage locations 12 and details of goods 13 to be picked up, such as weight, volume, and type of material.

The planning of the loading and/or unloading of goods 13 may further comprise determining a loading and/or unloading location as the target location based on the site data 103.

The task to be performed may additionally or alternatively involve charging of the ESS (not shown), of the one or more vehicles 1. The input data used for planning of the at least one task in the action S4 may herein comprise the ESS data 104 and the charging station data 108 obtained in actions S32 and S33, respectively.

The task may further comprise positioning of a mobile charging station 8, comprised in the vehicle 1, in a suitable location at the site 2. A suitable location for the charging station 8 may be planned based on, e.g., the site data 103 obtained from the BIM 110, the vehicle data 109 and ESS data 104. The The prediction model 120 used for planning of the at least one task may be trained using site data 103, such as input data from the BIM 110, geographic location data 102, vehicle data 109, charging station data 108, and/or ESS data 104, to be able to deliver accurate predictions. For example, a selective parametric analysis may initially be performed to establish correlations between desired outputs relating to various tasks to be planned and input in the form of subsets of the site data 103, since the site data 103 may comprise large amounts of irrelevant data. This selective parametric analysis may be carried out before starting to use the model for actual task planning. When a request relating to the planning of a specific task is later received, a relevant subset of the site data to be used as input data for the planning of the at least one task may hence be selected.

Once the selective parametric analysis has been performed, the prediction model 120 may be trained using route planning/machine learning/artificial intelligence/neural network training algorithms such as Dijkstra's algorithm for path planning, the Levenberg-Marquardt algorithm, or the Bayesian Regularization algorithm for training the neural network with non-linear relationships, with requests 101, geographic location data 102, site data 103 and vehicle data 109 used as training data for training the prediction model. Simulated and/or real-world conditions may be used for the training. An accuracy may be tested while training the prediction model and hence, the amount of training data may be suitably selected based on a desired accuracy of the model. The prediction model 120 may for example be trained until an accuracy of a first accuracy threshold, a second accuracy threshold, or a third accuracy threshold is reached. The trained prediction model may be updated with new training data at any suitable time. The prediction model 120 may thereby be improved over time.

The tuning of the prediction model 120 to a desired accuracy depends on the amount and quality of data available. For example, when the site data 103 gives the dimensions of the site 2 and coordinates of the structures and machinery within the site 2 that have a high correlation with the problem of navigating vehicles 1 within the site 2, a shortest path algorithm such as Dijkstra's algorithm may be applied to find the best travel 5 path to navigate.

Using a Markov process, it is further possible to predict events based on historical data. That will help in predicting randomness that can occur in any evolving site 2 such as a construction site. The action S4 of planning the at least one task may herein comprise predicting an evolvement of the evolving site 2 based on at least historical site data, and optionally on user input received via the at least one user interface.

Action S5

The method further comprises an action S5 of providing information 105 relating to the planned at least one task to be presented via the at least one user interface 7. The information 105 may hence be transmitted to the user interface 7. The information may be adapted to the user 6 depending on a user category of the user 6. For example, when the user 6 is a vehicle operator, information that enables presentation of at least the planned travel path 5 to the vehicle operator may be provided. The information can be presented graphically to the user 6 via the user interface 7, such as in the form of a visualising map displayed on a screen of the user interface 7. Hence, the vehicle operator will receive information including a route map of the site 2 and the travel path 5 for navigating within the site 2. The vehicle operator may also be provided with information relating to, e.g., a remaining distance to empty, and/or a maximum power expected to be required while the goods are transported according to the geography and/or topography of the site. A user higher up in the hierarchy, such as a vehicle fleet manager, may be presented with information relating to charging intervals, amount of goods transported within the site 2, a number of vehicles within the site 2, a number of vehicles about to reach the site 2, and a number of vehicles that has left the site.

To be able to present user tailored information, the method may further comprise an action of obtaining information relating to the user category of the user 6. The information relating to the planned at least one task may thereby be selectively provided for presentation via the at least one user interface 7, depending on the user category. The action of obtaining information relating to the user category of the user 6 may, for example, comprise receiving such information from the user interface 7. Encryption algorithms and security protocols may be used to ensure a correct level of access for various user categories.

Action S6

The method further comprises an action S6 of generating site update data 106 for updating the dynamic BIM 110 based on user input received via the at least one user interface 7 in connection with performing and/or completing the planned at least one task. The user input used for generating site update data 106 may be, for example, user commands, selections from multiple-choice lists, entries of numbers and/or text strings, etc. The user input generates user input data 107 that is transmitted from the user interface 7 to the control system 130, in which site update data 106 is generated and transmitted for updating the BIM 110.

Action S7

The method may further comprise an action S7 of updating the prediction model 120 based on the user input received via the at least one user interface 7 in connection with performing and/or completing the planned at least one task. For example, a site manager may input information relating to GNSS, e.g. GPS, locations of inventory and/or charging stations 8. Such information can be used for updating the prediction model 120, thereby improving its accuracy.

Various encryption algorithms and security protocols may be used to ensure data protection and to ensure a level of access to various users 6.

Figure 4A:
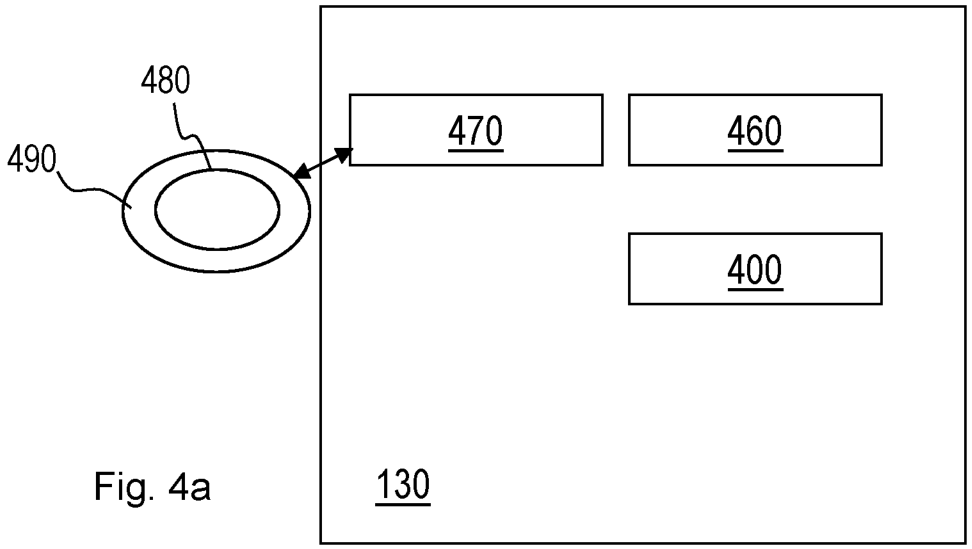
FIG. 4*a-b* are schematic block diagrams illustrating a control system according to embodiments herein.
Figure 4B:
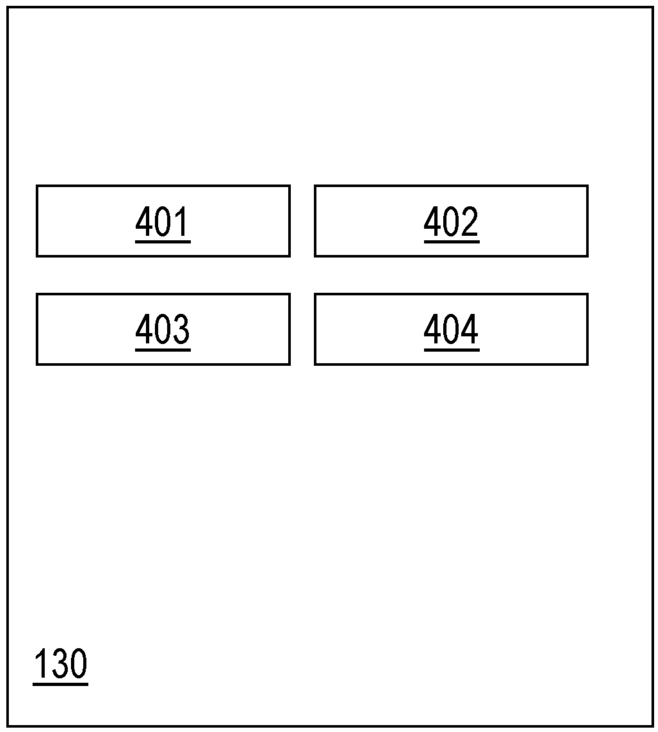

To perform the method steps described herein, the control system 130 may be configured to perform any one or more of the above actions S1-S7, and/or any other examples or embodiments herein. The control system 130 may for example comprise an arrangement as depicted in FIGS. 4*a* and 4*b*.

The control system 130 may comprise an input and output interface 400 configured to communicate with any necessary components and/or entities of embodiments herein, e.g., to receive site data 103, geographic location data 102, vehicle data 109, charging station data 108, and/or ESS data 104. The input and output interface 400 may comprise a wireless and/or wired receiver (not shown) and a wireless and/or wired transmitter (not shown). The control system 130 may be arranged in any suitable location, such as in a central server or in a control station. The control system 130 may use the input and output interface 400 to control and communicate with various systems and interfaces in the vehicle 1, the user interface 7, a control unit or server holding the BIM 110, the charging station 8, etc., by using any one or more out of a Controller Area Network (CAN), ethernet cables, Wi-Fi, Bluetooth, and other network interfaces.

The control system 130 is arranged to, by means of an obtaining unit 401, obtain a request 101 relating to at least one task to be performed by the one or more vehicles 1, wherein the at least one task involves at least travelling from a starting location 3 to a target location 4 within the evolving site 2. The control system 130 is further arranged to, by the obtaining unit 401, obtain geographic location data 102, wherein the geographic location data comprises at least the starting location and the target location of the one or more vehicles. The control system 130 is further arranged to, by the obtaining unit 401, obtain site data 103 from at least a dynamic building information model 110 of the evolving site 2.

The control system 130 is further arranged to, by means of a planning unit 402, plan the at least one task by using at least the request 101, the geographic location data 102, and the site data 103 as input data to a prediction model 120, wherein the planning of the at least one task comprises at least planning of a travel path 5 within the evolving site 2 from the starting location 3 to the target location 4.

The control system 130 is further arranged to, by means of a providing unit 403, provide information 105 relating to the planned at least one task to be presented via the at least one user interface 7.

The control system 130 is further arranged to, by means of a generating unit 404, generate site update data 106 for updating the dynamic building information model based on user input received via the at least one user interface 7 in connection with performing and/or completing the planned at least one task.

The method described herein may be implemented through a processor or one or more processors, such as a processor 460 of a processing circuitry in the control system 130 depicted in FIG. 4*a*, together with computer program code for performing the functions and actions of the embodiments herein. The program code mentioned above may also be provided as a computer program medium, for instance in the form of a data computer readable medium carrying computer program code for performing the method steps described herein when being loaded into the control system 130. One such computer readable medium may be in the form of a memory stick. The computer program code may furthermore be provided as pure program code on a server and downloaded to the control system 130.

The control system 130 may further comprise a memory 470 comprising one or more memory units. The memory 470 comprises instructions executable by the processor in control system 130. The memory 470 is arranged to be used to store, e.g., information, data, control scenarios, costs, etc. to perform the methods herein when being executed in the control system 130.

In some embodiments, a computer program 480 comprises instructions, which when executed by a computer, e.g., the at least one processor 460, cause the at least one processor of the control system 130 to perform the method steps described above.

In some embodiments, a computer-readable storage medium 490 comprises the respective computer program 480. The computer-readable storage medium 490 may comprise program code for performing the method steps described above when said program product is run on a computer, e.g., the at least one processor 460.

Those skilled in the art will appreciate that the units in the control system 130 described above may refer to a combination of analogue and digital circuits, and/or one or more processors configured with software and/or firmware, e.g., stored in the control unit 5, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip.

It is to be understood that the present invention is not limited to the embodiments described above and illustrated in the drawings; rather, the skilled person will recognize that many changes and modifications may be made within the scope of the appended claims.

The invention claimed is:

1. A computer-implemented method for use in planning of tasks to be performed by one or more vehicles within an evolving site, the method comprising:

obtaining a request relating to at least one task to be performed by the one or more vehicles, wherein the at least one task involves at least travelling from a starting location to a target location within the evolving site, obtaining geographic location data, wherein the geographic location data comprises at least the starting location and the target location of the one or more vehicles, obtaining site data from at least a dynamic building information model, BIM, of the evolving site, planning of the at least one task by using at least the request, the geographic location data, and the site data as input data to a prediction model, wherein the planning of the at least one task comprises at least planning of a travel path within the evolving site from the starting location to the target location, transmitting the planned at least one task to the one or more vehicles to cause execution of the planned at least one task, wherein the execution comprises navigation by a vehicle along the determined travel path, providing the determined path relating to execution of the planned at least one task by the one or more vehicles, wherein the determined path is to be presented via at least one user interface, receiving, via the at least one user interface and in connection with performance and/or completion of the planned at least one task by the one or more vehicles, user input indicating a real-world change, status, or outcome related to execution of the task, updating the dynamic building information model with site update data generated based on the user input received via the at least one user interface in connection with the performance and/or completion, by the one or more vehicles, of the planned at least one task within the evolving site.

2. The method according to claim 1, wherein the at least one task comprises charging of an electric energy storage system, ESS, of the one or more vehicles, and wherein the method further comprises:

obtaining ESS data comprising information relating to a state-of-charge of the ESS, obtaining charging station data comprising information relating to a location and a status of at least one charging station within the evolving site, wherein the input data used for planning of the at least one task comprises the obtained ESS data and charging station data.

3. The method according to claim 1, wherein the at least one task comprises loading and/or unloading of goods.

4. The method according to claim 3, wherein the method further comprises:

obtaining vehicle data relating to at least a vehicle weight and/or a vehicle payload capacity of the one or more vehicles, wherein the vehicle data is used as input data for the planning of the loading and/or unloading of goods.

5. The method according to claim 3, wherein the planning of the loading and/or unloading of goods comprises determining a loading and/or unloading location as the target location based on the site data.

6. The method according to claim 1, wherein the site data obtained from the BIM comprises data relating to one or more of the following:

boundaries of the evolving site, coordinates and dimensions of features/structures within the evolving site, material stocks within the evolving site, materials used for construction within the evolving site, available storage space within the evolving site, status of equipment located within the evolving site, manpower within the evolving site, a time log of the evolving site.

7. The method according to claim 1, further comprising:

based on the obtained request, selecting a subset of the site data to be used as input data for the planning of the at least one task, preferably wherein selecting the subset of the site data is performed based on a previously established correlation between the at least one task and the selected subset of the site data.

8. The method according to claim 1, wherein obtaining the request relating to the at least one task comprises receiving a user request via the at least one user interface.

9. The method according to claim 1, wherein the planning of the at least one task comprises predicting an evolvement of the evolving site based on at least historical site data, and optionally on user input received via the at least one user interface.

10. The method according to claim 1, wherein generating site update data for updating the dynamic building information model is further performed based on geographic location data collected by the one or more vehicles during performance of the at least one task.

11. The method according to claim 1, further comprising:

obtaining information relating to a user category of a user, wherein the information relating to the planned at least one task is selectively provided for presentation via the at least one user interface, depending on the user category.

12. The method according to claim 1, wherein, when the user is a vehicle operator, providing information relating to the planned at least one task comprises providing information that enables presentation of at least the planned travel path to the vehicle operator.

13. A non-transitory computer readable medium carrying a computer program comprising program code for, when the program code is run on a computer, performing:

obtaining a request relating to at least one task to be performed by the one or more vehicles, wherein the at least one task involves at least travelling from a starting location to a target location within the evolving site, obtaining geographic location data, wherein the geographic location data comprises at least the starting location and the target location of the one or more vehicles, obtaining site data from at least a dynamic building information model, BIM, of the evolving site, planning of the at least one task by using at least the request, the geographic location data, and the site data as input data to a prediction model, wherein the planning of the at least one task comprises at least planning of a travel path within the evolving site from the starting location to the target location, transmitting the planned at least one task to the one or more vehicles to cause execution of the planned at least one task, wherein the execution comprises navigation by a vehicle along the determined path, providing the determined path relating to the execution of the planned at least one task by the one or more vehicles, wherein the determined path is to be presented via at least one user interface, receiving, via the at least one user interface and in connection with performance and/or completion of the planned at least one task by the one or more vehicles, user input indicating a real-world change, status, or outcome related to execution of the task, updating the dynamic building information model with site update data generated based on the user input received via the at least one user interface in connection with the performance and/or completion, by the one or more vehicles, of the planned at least one task within the evolving site.

14. A control system for planning of tasks to be performed by one or more vehicles within an evolving site, the control system comprising one or more electronic control units;

at least one user interface;

at least one memory;

wherein the one or more electronic control units are operatively coupled to the memory and the at least one user interface and are configured to:

obtain a request relating to at least one task to be performed by the one or more vehicles, wherein the at least one task involves at least travelling from a starting location to a target location within the evolving site;

obtain geographic location data, wherein the geographic location data comprises at least the starting location and the target location of the one or more vehicles;

obtain site data from at least a dynamic building information model (BIM) of the evolving site;

plan the at least one task by using at least the request, the geographic location data, and the site data as input data to a prediction model, wherein the planning of the at least one task comprises at least planning of a travel path within the evolving site from the starting location to the target location;

transmit the planned at least one task to the one or more vehicles to cause execution of the planned at least one task, wherein the execution comprises navigation by a vehicle along the determined path;

provide the determined path relating to the execution of the planned at least one task by the one or more vehicles, wherein the determined path is to be presented via the at least one user interface;

receive, via the at least one user interface and in connection with performance and/or completion of the planned at least one task by the one or more vehicles, user input indicating a real-world change, status, or outcome related to execution of the task; and updating the dynamic building information model with site update data generated based on the user input received in connection with the performance and/or completion, by the one or more vehicles, of the planned at least one task within the evolving site.

* * * * *